US005112683A

United States Patent [19]

Johansen

[11] Patent Number: 5,112,683

[45] Date of Patent: May 12, 1992

[54] HIGH TEMPERATURE RESISTANCE MASK

[75] Inventor: Eivind Johansen, Weare, N.H.

[73] Assignee: Chomerics, Inc., Woburn, Mass.

[21] Appl. No.: 605,631

[22] Filed: Oct. 30, 1990

[51] Int. Cl.[5] .......................... B05D 1/08; B32B 7/12

[52] U.S. Cl. .................................. 428/354; 428/937; 427/423

[58] Field of Search ................ 427/423; 428/354, 937

[56] References Cited

U.S. PATENT DOCUMENTS

| | | | |
|---|---|---|---|
| 3,932,143 | 1/1976 | Marshall et al. | 427/423 X |
| 4,190,044 | 2/1980 | Patel | 75/252 |
| 4,405,284 | 9/1983 | Albrecht et al. | 427/423 X |
| 4,960,643 | 10/1990 | Lemelson | 428/336 X |
| 4,961,973 | 10/1990 | Molnar | 427/423 |

*Primary Examiner*—George F. Lesmes

*Assistant Examiner*—D. R. Zirker

*Attorney, Agent, or Firm*—John Dana Hubbard; William L. Baker

[57] ABSTRACT

A mask, preferably for high temperature applications, such as flame spray processes, welding or soldering. The mask consists of an uppermost sacrificial layer formed of a high temperature resistant polymer, a perforated metal layer, preferably a metal screen bonded to the lower surface of the sacrificial layer, a barrier layer formed of a high temperature resistant polymer and bonded to the lower surface of the perforated metal layer, an adhesive layer applied to the lower surface of the barrier layer and a release layer covering the adhesive until used. Additional layers and additives such as flame retardants may be used. A preferred additional layer is comprised of a vermiculite dispersion which is coated onto the top of the sacrificial layer.

13 Claims, 1 Drawing Sheet

HIGH TEMPERATURE RESISTANCE MASK

The present invention relates to a mask for painting or spraying operations. Moreover, it relates to a temperature and flame resistant mask especially for flame spraying applications.

BACKGROUND OF THE INVENTION

There exist several well known high temperature spray methods in the industry today. Most use a high temperature, open flame into or through which is passed a metal substance which is capable of being melted by the flame and sprayed by the apparatus onto a substrate. Frequently, this type of flame spray operation is used to repair or rebuild worn metal parts such as turbine blades or shafts, etc. The molten metal sprayed by the apparatus coats and fills any cracks or eroded portions of the metal substrate so that the replacement of the entire structure is not required.

One problem with such a flame spray system is that the spray does not always coat only those portions which need the metal. Depending upon the conditions of the equipment, the operator and the substrate being treated, areas surrounding the worn substrate are coated with the molten metal to some degree. At the very least, this is uneconomical in that the metal is being applied to a portion of the surface where it is not needed. More often, it is a hindrance and should be removed for aesthetic reasons. In the worst case, the additional metal upsets the mechanics of the device and therefore the metal must be removed, e.g. in a jet turbine, the additional metal on a turbine blade could upset the balance and thus the performance of the turbine.

A mask formed of metal has been used to cover the area surrounding that which is to be treated. Unfortunately, such a mask is difficult to make and must be custom manufactured for each application.

The present invention provides an improved mask for such high temperature and/or open flame spraying processes, which is inexpensive and may be easily custom formed to the desired configuration.

SUMMARY OF THE INVENTION

The present invention is a mask for high temperature and/or open flame spray treatments. The mask is formed of a plurality of layers laminated or crosslinked together to form a cohesive, unitary sheet that may be die cut to a desired configuration. The mask according to a preferred embodiment has a lower adhesive layer for securing the mask to a desired substrate, a barrier layer for preventing the penetration of the molten metal or other hot spray to the substrate below, a perforated metal layer which acts to coagulate the spray substance and a sacrificial layer formed of a high temperature resistant polymer.

IN THE DRAWINGS

DETAILED DESCRIPTION OF THE INVENTION

Figure 1:
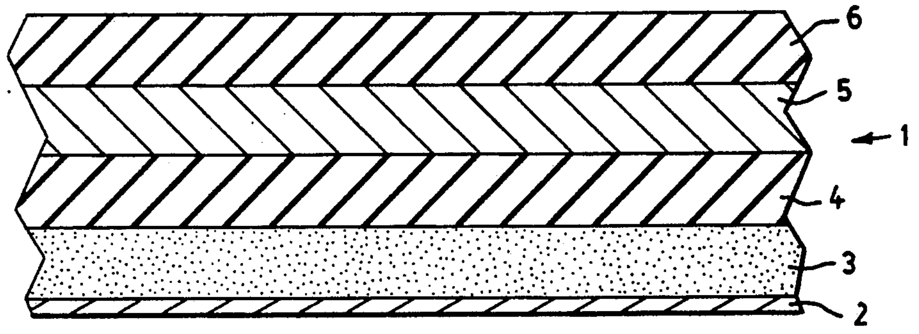
FIG. 1 shows a cross-sectional view of a preferred embodiment of the present invention.

In FIG. 1 is shown a preferred embodiment of the present invention. The mask 1 has an optional lower release layer 2 which covers an adhesive layer 3 for releasably securing the mask to a desired substrate. Superimposed upon the adhesive layer 3 is a barrier layer 4. Overlaying the barrier layer 4 is a perforated metal layer 5 which is covered by a sacrificial layer 6.

The uppermost layer of the mask is preferably a sacrificial layer 6. It is intended to be destroyed by the flame spray process, generally being burned or abraded away by the molten metal spray. Its function is to delay the advancement of the spray into the other layers of the mask. Such a layer is preferably formed from a high temperature resistant polymer such as silicone rubbers, fluorosilicone rubbers, thermoplastic rubber, nylons, polyimides, polyamides, aramids or combinations thereof. It may be in the form of a sheet or it may be cast in place. The thickness of the sacrificial layer should be from about 0.020 inch to about 0.050 inch, preferably about 0.030 inch. A thicker sacrificial layer may be used, however it is not preferred as it is believed that a sacrificial layer having a thickness greater than 0.050 inch may interfere with the spray process or the removal of the mask after the process.

The perforated metal layer 5 lies directly below the sacrificial layer 6 and is bonded to it. The perforated metal layer is intended to stop most, if not all, of the molten metal spray. The layer is perforated so that it may trap the molten spray into and onto its surface and cause it to impinge or build up on the metal layer, thus clogging the perforated metal and insuring the survival of the barrier layer below it. The perforated metal layer is preferably a screen although other perforated metal sheets may be used. The layer is formed of a metal such as brass, copper, aluminum, steel, including stainless steel, nickel, various alloys and specialty metals such as titanium, and alloys of the above. Such specialty metals may be used, however due to their costs they are not preferred.

A screen is preferred as it provides an easy means for obtaining the desired perforations.

A screen and/or a perforated metal layer, useful in the present invention, should have a large number of relatively small openings so that it may trap and secure the metal spray to its surface without destroying the barrier layer below it. If a screen or perforated metal layer has a few, relatively large openings per square inch, it is more likely that the barrier layer will be greatly contacted by the spray, which will abrade and degrade the barrier layer. Moreover, such a screen or perforated metal sheet may cause the layer to delaminate from the barrier layer, thus causing the mask to fail.

Likewise, the thickness of the metal layer must be sufficiently thick so that it does not melt or abrade to a great extent during the spray application, yet it cannot be so thick that it renders the mask inflexible or too thick for use in the flame spray applications. In a screen, the thickness of the screen is controlled to a large extent by the diameter of the wire that is used, while in a perforated metal sheet the thickness of the metal sheet itself is controlling. Such a screen or metal sheet should have from about 50 to about 150 openings or perforations per square inch and should be formed from a wire or metal sheet approximately 0.003 to 0.006 inch in diameter or thickness (respectively).

A preferred perforated metal layer is a screen formed of stainless steel, having 100 openings per square inch and a wire diameter of about 0.0045 inch. Such a screen is available from Newark Wire Cloth.

The barrier layer 4 is directly below the perforated metal layer 5 and is bonded to it. The barrier layer is preferably formed of a high temperature resistant polymer as used in the sacrificial layer, namely polyimides, polyamides, aramids, silicone rubbers, fluorosilicone rubbers, etc. For cost and manufacturing advantages, the barrier layer is preferably formed from a silicone rubber. Preferably, it is a curable silicone rubber such as room temperature vulcanizable silicone rubber or a sulfur cured silicone rubber. The barrier layer protects the substrate from the effects of the flame spray including the buildup of metal on the substrate. Moreover, it provides a surface to which the adhesive layer may be secured.

Preferably, the barrier layer is of a thickness sufficient to survive the abrasive and thermal effects of the flame spray application, but is sufficiently thin so as to be relatively inexpensive and to form a relatively thin, overall, mask. Desirably, the barrier layer if from about 0.050 to about 0.10 inch in thickness, more preferably about 0.080 inch in thickness.

The adhesive layer is coated onto the bottom exposed surface of the barrier layer and secures the mask to the substrate. Preferably the adhesive layer is formed of an adhesive that is compatible with the barrier layer so that it forms a tight bond between the mask and the substrate. If desired, it may be formed of a pressure sensitive adhesive.

A preferred adhesive is a silicone rubber based room temperature vulcanizable adhesive, such as R.T.V. 732 CLEAR manufactured by Dow Corning, although other adhesives which are well known in the art may also be used.

The adhesive layer should be sufficiently thick so as to obtain a secure bond between the mask and the substrate. Preferably, it should be from about 0.010 to 0.030 inch in thickness, more preferably about 0.020 inch in thickness.

The adhesive layer is preferably covered by a release paper or plastic film layer until used. Such release layers are well known in the art and commercially available from a number of sources.

Figure 2:
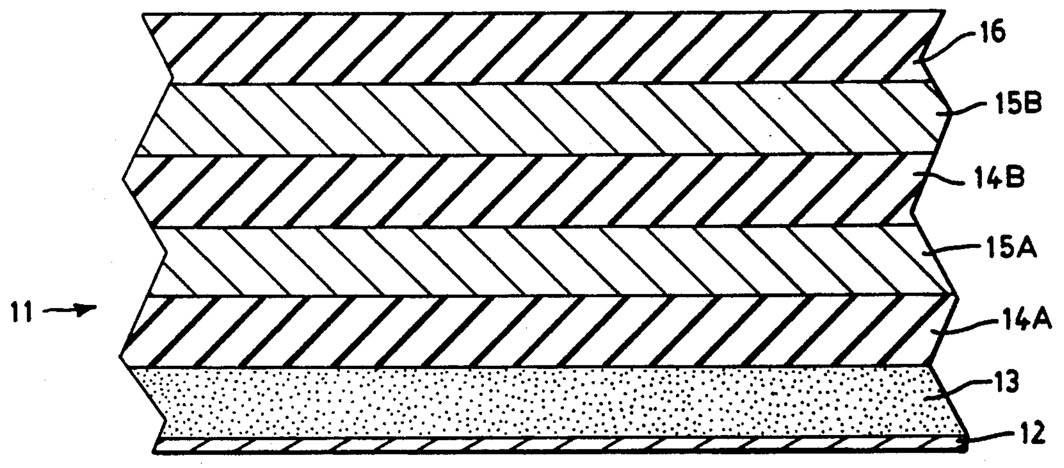
FIG. 2 shows a cross-sectional view of another preferred embodiment of the present invention.

In FIG. 2 is shown another preferred embodiment of the present invention. In this embodiment, one may use two or more perforated metal layers as well as two or more sacrificial and/or barrier layers. The mask 11 according to this embodiment has a release layer 12, an adhesive layer 13, a first barrier layer 14A, a first perforated metal layer 15A, a second barrier layer 14B, a second perforated metal layer 15B and a sacrificial surface layer 16, all layers overlaying the preceding layer and being bonded thereto.

This embodiment and modifications or variations of it is useful when the temperature of the spray application is sufficiently high or the time of exposure is sufficiently long or the amount of metal buildup is sufficiently great, so as to substantially destroy the embodiment of FIG. 1.

Additional additives/layers may be incorporated into the present invention. For example, it may be desirable to add one or more flame retardants to the sacrificial and/or barrier layer so as to slow the destructive effects of the spray upon those layers. Moreover, it may be desirable to add additional sacrificial, barrier or perforated metal layers as described above in regard to the embodiment of FIG. 2.

One additional layer that provides some advantages is a flame resistant sacrificial layer formed from a vermiculite dispersion. Vermiculite is a mineral which can be formed into platelet-like particles. When coated onto a substrate, via a dispersion, the particles tend to lay flat and overlap each other. Vermiculite is highly temperature resistant and therefore adds to the ability of the mask to resist the effect of the flame spray. Such a coating may be applied to the outer surface of the sacrificial layer and/or to the upper surface of the barrier layer. Moreover, one can incorporate one or more layers of vermiculite dispersion coatings between a plurality of thin sacrificial and/or barrier layers to enhance its effects. Such coatings are well known and are available, for example, from W. R. Grace & Co.-Conn. of Cambridge, Mass.

The present invention can be formed by a variety of methods, however a laminating method is preferred as it is relatively simple and inexpensive.

One such method is to bond or cast a sacrificial layer (depending upon whether the layer is in a film or liquid form) onto the perforated metal layer. The sacrificial/metal layers are then bonded to the barrier layer to form a unitary laminated structure. The adhesive layer is then coated onto the exposed bottom surface of the barrier layer and covered by a release paper or plastic film until used.

More Preferably, the process of forming the mask is to compound and form the barrier layer of an uncured silicone rubber and impose the perforated metal layer of stainless screen onto one of the major surfaces of the barrier layer. A sacrificial layer is then placed onto the perforated metal layer in the form of an uncured silicone sheet. The three layers are then subjected to pressure to cause the sacrificial layer and the barrier layer to penetrate the perforations of the metal layer. The silicone layers are then cured so as to bond the layers together. An adhesive layer is then applied to the bottom surface of the barrier layer and covered by a release paper or plastic film.

The laminate is now in the form of a sheet. It may be cut to any desired configuration, preferably it is die cut as this type of cut forms a smooth edge to the mask and forms an exact configuration with very close tolerances.

The mask, having been cut to the desired configuration, has the release layer removed from the adhesive layer and the adhesive layer is imposed upon the substrate to be treated in the desired location. The substrate is then subjected to the flame spray, allowed to cool and the mask is then removed. If desired the area covered by the mask may be cleaned to remove any residual adhesive.

While this invention has been described in regard to its preferred use, i.e. flame spray applications, it may have other uses as well. For example, the mask may be used as a heat shield for welding or soldering operations to protect a surface from the effects of an open flame. It may be useful in sand blasting or other abrasive operations where a mask might be useful.

While the present invention has been described in relation to its preferred embodiment, it is clear to one skilled in the art that other modifications, variations and equivalents may be useful in the present invention. It is intended in the appended claims to encompass all such embodiments and modifications, variations, and equivalents thereof as fall within the true spirit and scope of this invention.

What I claim is:

1. A high temperature resistant paint mask comprising a) a lowermost adhesive layer;

b) a barrier layer formed of a high temperature resistant polymer superimposed upon the adhesive layer;

c) a perforated metal layer superimposed upon the barrier layer; and d) a sacrificial layer formed of a high temperature resistant polymer superimposed upon the metal layer.

2. The temperature resistant mask of claim 1 wherein the adhesive layer is a room temperature vulcanizing silicone adhesive, the barrier layer is a flexible elastomeric layer about 0.080 inch in thickness; the perforated metal layer is a metal screen having a wire diameter of from about 0.003 to 0.01 inches and from 50 to 150 openings per square inch and the sacrificial layer is selected from the group consisting of silicone rubbers, fluorosilicone rubbers, thermoplastic rubbers, nylons, polyimides, polyamides and combinations thereof.

3. The mask of claim 1 further comprising a thermally resistant layer formed on top of the sacrificial layer and comprised of a vermiculite dispersion coating.

4. The mask of claim 1 wherein the metallic layer is a wire screen having about 100 openings per square inch and a wire diameter of about 0.0045 inches, the wire screen being selected from the group consisting of brass, copper, stainless steel, steel, aluminum, nickel, specialty metals and alloys thereof.

5. The mask of claim 1 further comprising a release layer attached to the exposed surface of the adhesive layer.

6. A mask for high temperature flame spray applications comprising a laminate formed of a upper sacrificial layer of silicone rubber, the sacrificial layer overlaying and being bonded to a layer of metal screen, the metal screen layer overlaying and being bonded to a barrier layer of silicone rubber and an adhesive layer coated on a bottom surface of the barrier layer, the adhesive layer being covered by a release layer.

7. The mask of claim 5 further comprising a second metal layer and a second barrier layer disposed between the barrier layer and the adhesive layer.

8. A mask comprising a laminate formed of an uppermost sacrificial layer selected from the group consisting of silicone rubbers, fluorosilicone rubbers, thermoplastic rubbers, nylons, polyimides, polyamides and combinations thereof, the sacrificial layer overlaying and being bonded to a perforated metal layer wherein the metal is selected from the group consisting of brass, copper, stainless steel, steel, aluminum, nickel, specialty metals and alloys thereof the perforated metal overlaying and being bonded to a barrier layer of silicone rubber, the barrier layer having its lowermost surface coated with an adhesive layer, the adhesive layer being covered by a release layer.

9. The mask of claim 7 wherein the sacrificial layer is formed of silicone rubber, the perforated metal layer is a stainless steel screen, the barrier layer is formed of silicone rubber and the adhesive layer is a room temperature vulcanizing silicone adhesive.

10. The mask of claim 8 wherein the screen has about 100 openings per square inch and a wire diameter of about 0.0045 inches.

11. The mask of claim 7 further comprising a thermally resistant layer formed on top of the sacrifical layer and comprised of a vermiculite dispersion coating.

12. The mask of claim 8 further comprising a second perforated metal layer and a second barrier layer disposed between the barrier layer and the adhesive layer.

13. A mask comprising a thermally resistant top layer formed of a vermiculite dispersion coating, the top layer overlaying, a sacrificial layer of high temperature resistant polymer selected from the group consisting of silicone rubbers, fluorosilicone rubbers, thermoplastics, nylons, polyimides, polyamides, aramids and combinations thereof, the sacrificial layer overlaying a perforated metal layer, the perforated metal layer overlaying a barrier layer formed of a high temperature resistant polymer, the barrier layer having its lowermost surface coated with an adhesive layer, the adhesive layer having its lowermost surface covered by a removable release layer.

* * * * *